US009219966B2

(12) United States Patent
Wang et al.

(10) Patent No.: US 9,219,966 B2
(45) Date of Patent: Dec. 22, 2015

(54) LOCATION BASED ASSISTANCE USING HEARING INSTRUMENTS

(71) Applicant: Starkey Laboratories, Inc., Eden Prairie, MN (US)

(72) Inventors: Libin Wang, Minnetonka, MN (US); Stephen Paul Flood, Eden Prairie, MN (US); Jeffrey Paul Solum, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 13/752,203

(22) Filed: Jan. 28, 2013

(65) Prior Publication Data

US 2014/0211973 A1 Jul. 31, 2014

(51) Int. Cl.
| | |
|---|---|
| H04R 25/00 | (2006.01) |
| H04W 4/02 | (2009.01) |
| H04W 8/00 | (2009.01) |
| G06F 21/35 | (2013.01) |
| G07C 9/00 | (2006.01) |
| H04L 29/06 | (2006.01) |
| H04W 12/06 | (2009.01) |

(52) U.S. Cl.
CPC ............ *H04R 25/554* (2013.01); *G06F 21/35* (2013.01); *H04R 25/505* (2013.01); *H04W 4/02* (2013.01); *H04W 8/005* (2013.01); *G07C 9/00309* (2013.01); *G07C 2209/63* (2013.01); *H04L 63/0853* (2013.01); *H04R 25/558* (2013.01); *H04R 2225/55* (2013.01); *H04R 2460/07* (2013.01); *H04W 12/06* (2013.01)

(58) Field of Classification Search
USPC .................................................. 381/315, 312
See application file for complete search history.

(56) References Cited

U.S. PATENT DOCUMENTS

| | | | |
|---|---|---|---|
| 6,122,500 | A | 9/2000 | Dent et al. |
| 6,549,625 | B1 | 4/2003 | Rautila et al. |
| 6,592,032 | B1 | 7/2003 | Takaragi et al. |
| 7,200,237 | B2 | 4/2007 | Zhang et al. |

(Continued)

FOREIGN PATENT DOCUMENTS

| | | |
|---|---|---|
| EP | 1191448 A1 | 3/2002 |
| EP | 1443471 A2 | 8/2004 |

(Continued)

OTHER PUBLICATIONS

Giaglis, George M, et al., "Chapter IV: Towards a Classification Framework for Mobile Location Services", A Classification Framework for Mobile Commerce, (2003), 18 pgs.

(Continued)

*Primary Examiner* — Davetta W Goins
*Assistant Examiner* — Amir Etesam
(74) *Attorney, Agent, or Firm* — Schwegman Lundberg & Woessner, P.A.

(57) ABSTRACT

Disclosed in some examples is a method of authentication, the method comprising monitoring for the presence of a hearing instrument; responsive to detecting the hearing instrument: establishing a short-range wireless communication session with the hearing instrument; determining an identity of the hearing instrument wearer; and responsive to determining the identity of the wearer, setting a value indicating that the hearing instrument wearer is authenticated with and within the wireless range of the presence device.

25 Claims, 5 Drawing Sheets

(56) References Cited

U.S. PATENT DOCUMENTS

| | | | |
|---|---|---|---|
| 7,463,151 | B1 | 12/2008 | Schulte-Kellinghaus |
| 7,831,055 | B2 * | 11/2010 | Frerking ............. H04M 1/6066 379/52 |
| 8,112,066 | B2 | 2/2012 | Ayed |
| 2003/0100315 | A1 | 5/2003 | Rankin |
| 2004/0268132 | A1 | 12/2004 | Waris |
| 2008/0152098 | A1 | 6/2008 | Paryzek et al. |

FOREIGN PATENT DOCUMENTS

| | | |
|---|---|---|
| EP | 2055141 B1 | 5/2009 |
| WO | WO-02078381 A1 | 10/2002 |
| WO | WO-2007121414 A2 | 10/2007 |
| WO | WO-2010108492 A1 | 9/2010 |

OTHER PUBLICATIONS

Sadeh, Norman, M-Commerce Technologies, Services, and Business Models, John Wiley & Sons, Inc., (2002), 253 pgs.

Varshney, Upkar, "Location Management for Mobile Commerce Applications in Wireless Internet Environment", Journal: ACM Transactions on Internet Technology, vol. 3, No. 3, (Aug. 2003), 20 pgs.

Varshney, Upkar, "The Status and Future of 802.11-Based WLANS", Journal: Communications, (Jun. 2003), 4 pgs.

"European Application Serial No. 14152572.5, Response filed Jan. 30, 2015 to Extended European Search Report mailed Apr. 17, 2014", 16 pgs.

Jansen, Wayne, et al., "Proximity Based Authentication for Mobile Devices", http://csrc.nist.gov/groups/SNS/mobile_security/documents/mobile_devices/pp-proximityAuthentication-fin.pdf (last accessed Jan. 29, 2015).

Mundy, Ward, "Nerd Vittles: Follow-Me Phoning: Implementing Bluetooth Proximity Detection with Asterisk", http://nerdvittles.com/?p=78 (last accessed Jan. 29, 2015).

Security Dark Reading, "Phoenix Technologies Rolls Out Bluetooth Proximity Lock System", http://www.darkreading.com/attacks-breaches/phoenix-technologies-rolls-out-bluetooth-proximity-lock-system/d/d-id/1131031? (last accessed Jan. 29, 2015).

"European Application Serial No. 14152572.5, Extended European Search Report mailed Apr. 17, 2014", 7 pgs.

* cited by examiner

LOCATION BASED ASSISTANCE USING HEARING INSTRUMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Starkey Laboratories, Inc., All Rights Reserved.

BACKGROUND

Portable devices utilizing transceivers communicating using standardized protocols such as Bluetooth over short range wireless communication links are becoming more popular. For example, hearing instruments (e.g., hearing assistance devices) may incorporate such wireless technology to allow the hearing instrument to communicate with other devices. For example, the hearing instrument may receive audio from a transceiver which is connected to a television, radio, or some other device. This audio may be reproduced in the speaker of the hearing instrument, thus allowing the wearer to hear a television, radio, or other audio source without having to disturb others by turning up the volume on the audio source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
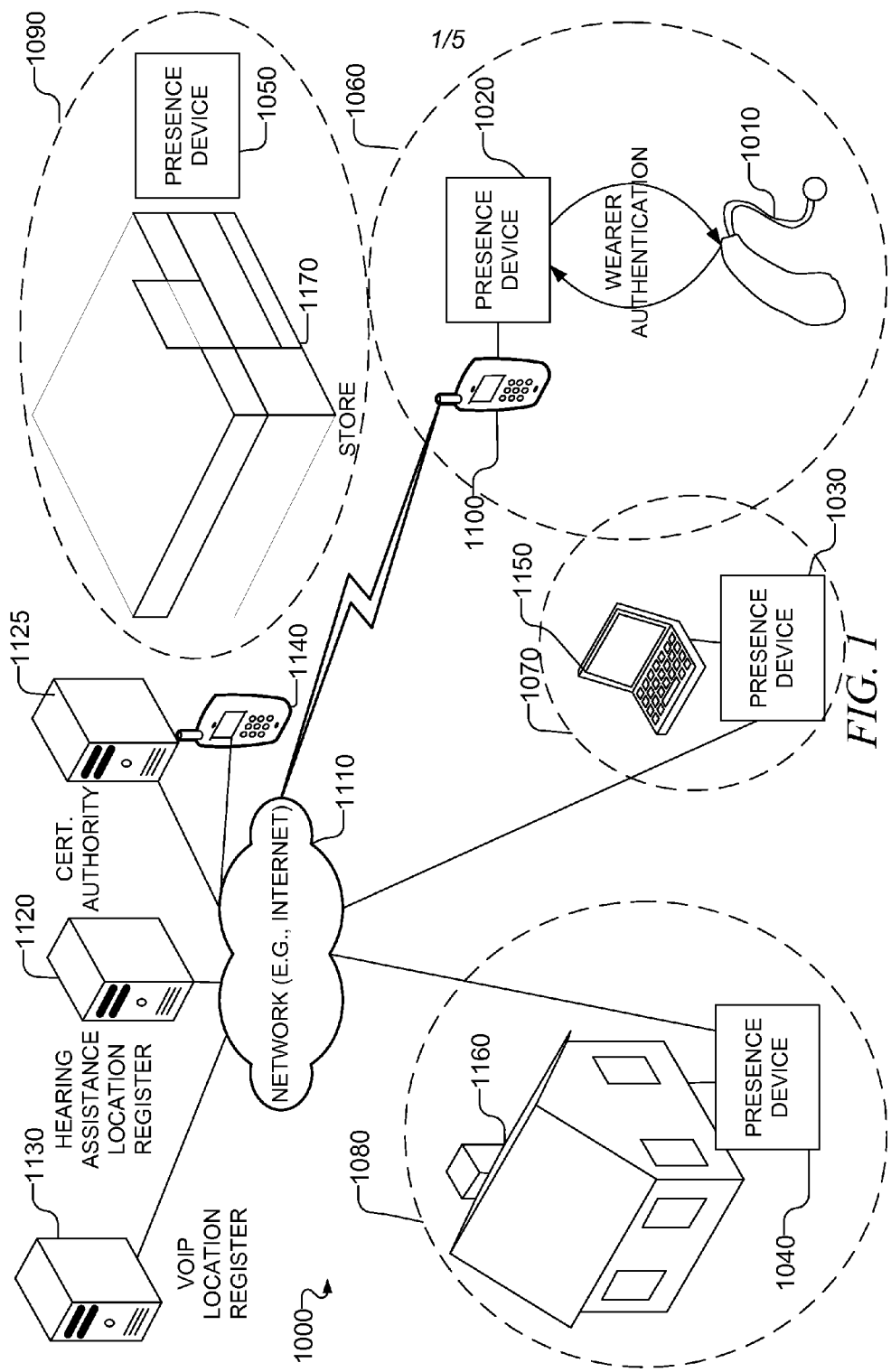
FIG. 1 shows a schematic of a system of location based services for hearing assistance devices according to some examples of the present disclosure.

Devices which are able to connect to a hearing instrument via the short range wireless protocol employed by the hearing instrument may have a high degree of confidence that the wearer is nearby. This is based on the short range of the wireless protocols typically used (e.g., a typical Bluetooth range is around 30 feet or less) and the fact that each hearing instrument is generally specific to a particular wearer and is frequently worn by the wearer. This is in contrast to other devices with short range wireless protocols that only provide a reasonable assurance that the device is nearby (as opposed to both the device AND the owner). Due to this high degree of confidence that the wearer is nearby, unique location based services utilizing hearing assistance devices may be implemented. For example, a computer system logged in with the account of the wearer and locked may unlock when it is able to communicate with a hearing instrument of the wearer. Once the computer system is no longer able to communicate with the hearing instrument (e.g., the user walked out of range), the computer system may relock. This may allow the wearer to simply enter a room, sit down, and begin working and be secure in the knowledge that when the wearer exits the room, the computer will lock, protecting their data. Other example location based services include locking or unlocking a wearer's home or other some other building, locking, unlocking, or starting an automobile, updating an address in a location register (e.g., a Voice over Internet Protocol VOIP register), or the like.

Disclosed in some examples are hearing instruments, devices, systems, machine-readable mediums, and methods for providing location based services to hearing instrument wearers. In some examples these location based services may be implemented by providing a presence device which may communicate with a hearing instrument using a short range wireless link to establish a wearer's presence. Location based service providers and applications may utilize the presence information communicated via the presence device to offer unique location based services to hearing instrument wearers. In some examples location based services may include location based authentication services. These location based authentication services may utilize the detection (and in some examples, the authentication) of the hearing instrument as a proxy for authenticating the wearer.

In some location based services examples, the system may utilize the presence information about the wearer to unlock various electronic and physical locks. For example, the hearing instrument may cause a computing device or other electronic device that is locked to grant access when the presence of the hearing assistance device is detected. In other examples, the hearing assistance device may serve as an electronic house key, car key, or other key for a physical lock. The lock may have a presence device integrated with or communicatively coupled to it which may detect the presence of the hearing instrument and unlock the lock. In some examples, an electronic ignition may be activated based on detecting the presence of the hearing instrument. For example, a wearer may enter their automobile and push a "start" button on their car to start their engine. A presence device embedded in the automobile may detect the presence of the hearing instrument and enable the start button. Other location based services may include instant billing. For example, a presence device may be incorporated into, or in communication with a point of sale device (POS) such as a vending machine or a sales terminal and may authenticate the wearer based upon a wearer's proximity to the presence device. The hearing instrument may also provide charging details (e.g., a credit card number, bank account number, a billing number or the like) to the presence device, which may communicate the charging details to the point of sale device. The POS device may then use the charging details to extract funds for purchases of the wearer.

To implement some hearing instrument based location services, the presence device may update a user's location in one or more location registers. This may enable various location based service providers to contact wearers remotely across a network by having centrally located registers which store a network address where the hearing assistance device is reachable as updated by any one of a number of presence devices. Thus the hearing assistance device may move from presence device to presence device and the location registers may be updated on a current network address to send content to the hearing assistance device. For example, upon detecting the hearing instrument's presence, the presence device may send a message over a network to a location register updating the location register with a network address where the presence device is reachable. The information sent by the presence device to the location register may include an identifier of the hearing instrument and/or the wearer with the IP or other address where the hearing instrument can be reached through a network. The location register may then inform other services on how to reach the wearer. In some examples, the IP address may be that of the presence device and the presence device may forward content received to the hearing assistance device. In other examples, the hearing instrument may have its own IP or other network address (e.g., the presence device, or some other device, may provide a network address and network access to the hearing instrument).

A location register may be useful for many location based services as it provides a centralized location (or plurality of locations) where network based services may determine a wearer's location and be able to forward location based content to the wearer. For example, the location register may be a Voice over Internet Protocol register (VoIP) which registers the reachable network addresses of VoIP users. The VoIP register stores an identifier of the user (e.g., a uniform resource identifier (URI)) and an IP address where that URI is reachable. The presence device may send the wearer's unique URI with the network address of the presence device. Phone calls from VoIP devices are then forwarded to the presence device, which may then forward the call to the hearing instrument. In some examples, the presence device may communicate with the VoIP location register using a Session Initiated Protocol (SIP). The presence device may be pre-configured with the URI of the wearer in some examples, but in other examples the hearing instrument may store the URI in non-volatile storage and transmit it either as part of a request when connected, during connection setup or authentication. In still other examples, the hearing instrument may have its own network address. For example, the presence device may provide access to the Internet or other network to the hearing instrument and may provide a network address to the hearing instrument. The hearing instrument may then use the presence device to contact the location register to update the IP address of the hearing instrument itself.

In other examples of location based services, the system may utilize the presence information to provide customized advertising to the wearer. For example, the presence device may provide (or may be provided by an advertising server) audio advertisements when the hearing instrument is detected in range. These advertisements may be personalized to the wearer as the system knows the identity of the wearer (which may be programmed in during fitting, manufacture, or device setup). This may allow the hearing instrument device manufacturers to provide the devices to the wearers at a reduced initial cost and make up those lost revenues through revenues derived from occasional advertisements delivered to the devices.

In yet other example location based services, an audiologist may utilize the hearing assistance register to locate the hearing assistance device. The audiologist may then communicate with the hearing assistance device to ascertain and change current parameters and settings of the hearing assistance device and to download statistics or other data collected by the hearing assistance device.

The hearing instruments may communicate with presence devices using one or more suitable wireless protocols operating on short range wireless links. For example, a Bluetooth wireless protocol (e.g., a Bluetooth Low Energy wireless protocol), a Shockburst® wireless protocol, an Enhanced Shockburst® wireless protocol, Wireless Fidelity (WiFi) protocols utilizing an Institute for Electrical and Electronics Engineers (IEEE) 802.11 family of standards, including 802.11n, 802.11ac, 802.11ad, 802.11ah, and the like. The Shockburst® and Enhanced Shockburst® wireless protocols are from Nordic Semiconductor of Trondheim, Norway. A short range wireless link may typically be a wireless link of less than 100 meters in range, as opposed to longer range wireless links such as those found on cellular systems which can have ranges as great as several kilometers. These radio links may operate in the unlicensed Industrial Scientific and Medical (ISM) spectrum in the United States (e.g., such as 900 MHz or 2.4 GHz) and other unlicensed spectrum in other countries. These short range wireless links are also low power and thus may be considered more optimal for hearing assistance devices which run on small batteries.

If the wireless protocol used includes authentication procedures necessary for connection setup, no additional authentication or authorization may be needed as the presence device may trust the security of the wireless connection. For example, Bluetooth requires a pairing process which establishes a cryptographic key called a link key which is used to encrypt communications between the devices. The hearing instrument and the presence device may be paired during hearing instrument fitting or via an initial setup. As such, the presence device may assume that if messages are properly decrypted, that the link key was used to encrypt them. Since only the presence device and the hearing instruments have knowledge of the link key, the presence device may have a high degree of confidence that the communications came from the hearing instrument.

For certain applications and in some examples, the presence device may require additional authentication with the hearing instrument. In these examples, additional authentication procedures may be carried out above and beyond the wireless protocol authentication. For example, the hearing instrument may send an encrypted password or key to the presence device which may verify the password or key with a stored password or key. If the received and decrypted password or key matches the stored password or key, the presence device may conclude that authentication succeeded. This password or key (and the information used to encrypt and decrypt these messages) may be stored in the hearing instrument and the presence device during manufacture, setup, hearing instrument fitting, or through a setup procedure. Other authentication techniques may be utilized. For example, a certificate authority may issue digital certificates to hearing instruments. During authentication the hearing instrument may send a digital certificate with a public key of the hearing instrument to the presence device. The presence device may verify the certificate using the certificate authority's public key (e.g., the certificate is digitally signed with the certificate authority's private key). To verify that another device has not stolen the hearing instrument's certificate, the presence device may issue a challenge to the hearing instrument which may be a question or some task (e.g., passing back random number sent in the challenge). The challenge is encrypted using the hearing instrument's public key (sent in the certificate). As the only way to decrypt the challenge is with the private key which corresponds to the public key, and only the hearing instrument has access to that private key, only the hearing instrument may decrypt the challenge. The response to the challenge may be encrypted with the private key of the hearing instrument (which can be decrypted only be the public key of the hearing instrument). Once the presence device receives the answer to the challenge, the answer is decrypted (if encrypted), and compared to the expected answer. If the answer matches, the hearing instrument is authenticated. If the answer does not match, authentication fails. In some examples, the hearing instrument may use a similar process utilizing a digital certificate of a presence device to verify the presence device.

In some examples, the presence device and the hearing instruments may implement one or more Bluetooth profiles which may assist in authentication and the exchange of information between the presence device as well as the monitoring of the connections between the presence device and the hearing instrument. For example, a Find Me profile may allow users to pair hearing instruments with presence devices and use the presence device to find the hearing instruments (e.g., by causing the hearing instruments to audibly alert). This may allow users to find misplaced hearing instruments. The Proximity profile extends the Find Me profile to include functions which determine whether the hearing instrument is in or out of range of the presence device.

The presence device may be any computing device which is able to wirelessly communicate with the hearing instrument and may include a desktop computer, a laptop computer, a tablet computer, a smartphone, a cell phone, a server computer, a Wi-Fi router, or the like. The presence device may provide location services directly to the hearing instrument itself, or instead, may provide presence information (e.g., whether or not the hearing assistance device is in communication range) to a location services device communicatively coupled to the presence device. For example a desktop computer which unlocks when the presence of a hearing instrument is detected may contain the hardware and software to configure the hardware in a way so as to constitute a presence device, or the desktop computer may be communicatively coupled (e.g., through a network, through a Universal Serial Bus—USB connection, or the like) to the presence device and receive or provide information on the location of the user.

As already noted, hearing assistance devices and presence devices may be provided digital certificates according to some examples. These certificates may be issued by regular certificate authorities, or the system may include one or more hearing assistance device certificate authorities which are setup for the purpose of providing these certificates. For example, the manufacturer of the system may setup these authorities as an alternative to commercially available certificate authorities (CA). These CAs may issue unique digital certificates for each hearing instrument. Digital certificates may be issued to hearing assistance devices at fitting, through a setup and configuration process, or at some other time. These certificates may uniquely identify each hearing instrument and is signed by the certificate authority. This enables the presence devices to authenticate the hearing assistance devices and/or the wearers of the hearing assistance devices.

FIG. 1 shows an example system 1000 of location based services based on hearing assistance devices according to some examples of the present disclosure. Hearing assistance device 1010 may communicate with one or more presence devices 1020-1050 when hearing assistance device 1010 is within the wireless range of the presence devices. Example wireless ranges of the presence devices are illustrated by circles 1060-1090. Presence device 1020 is connected to, or integral with, mobile device (e.g., a smartphone) 1100. The smartphone may detect the presence of the hearing assistance device 1010 based on presence device 1020 and may unlock itself for the user. In other examples, the mobile device 1100 may communicate over a long range wireless link (e.g., a cellular wireless link such as a Long Term Evolution wireless link or through a WiFi link such as through an 802.11 link) through a network 1110 to a hearing assistance location register 1120 or a VOIP location register 1130 (or both) to update the address information for the hearing assistance device. In these examples, a network address (e.g., an IP address) of the mobile device 1100 may be sent to the location registers as an address to send traffic destined for the hearing assistance device. Mobile device 1100 may forward traffic addressed to the hearing assistance device 1010 to the hearing assistance device. For example, packets sent to the mobile device 1100 may indicate to the mobile device to forward the packet to the hearing assistance device 1010.

Network 1110 may be any network which may communicatively couple the presence devices 1020-1050 to VOIP location register 1130, hearing assistance register 1130, Certificate Authority 1120, VOIP phone 1140, each other, or the like. Network 1110 may be or include a Local Area Network (LAN), a Wide Area Network (WAN), the Internet, a cellular network, or the like.

Hearing assistance device 1010 may enter presence device 1030's wireless range 1070. Laptop or other computing device 1150 may be configured to automatically unlock a user account of the wearer of the hearing assistance device 1010 based on detection of that presence by presence device 1030. The presence device 1030 may contact the hearing assistance register 1120 and/or the VOIP location register 1130 to register the network address of the laptop 1150 as the address for traffic destined for the hearing instrument 1010. The presence device 1030 may be integral with the laptop 1150. In some examples, hearing instrument 1010 may be in range of multiple presence devices (e.g., 1060 and 1070). In these examples, the hearing instrument may choose which presence device traffic addressed to it should be forwarded through.

The wearer's residence 1160 may have a presence device 1040 which may be configured to automatically unlock a door of the house based on detection of the hearing assistance device's presence. The presence device 1040 may also contact the hearing assistance register 1120 and/or the VOIP location register 1130 to register the IP address associated with residential network (e.g., the Internet) access as the address for packets destined for the hearing instrument.

Various retail outlets or other public places 1170 may install one or more presence devices 1050. The presence device 1050 may contact the hearing assistance register 1120 and/or the VOIP location register 1130 to register a network address of the presence device 1050 as the address for packets destined for the hearing instrument. In some examples, presence device 1050 may be used to serve advertisements or special offers to wearers in the store or to provide product information based on a detected location near products. For example, the store may have multiple presence devices with low transmit powers that allow for precise positioning in the store.

In some examples, the hearing instrument 1010 and the presence devices 1020-1050 may maintain their connection the entire time they are in range of each other. In other examples, the connection may be terminated once location is determined and may be periodically reconnected to ensure that the hearing instrument is still within range. If the hearing instrument 1010 is no longer in range, the presence device may note that the device is no longer in range and in some examples send a message to another device or component that the hearing instrument is no longer locatable (e.g., the VOIP location register 1130, hearing assistance location register 1120, the laptop 1150, the mobile device 1100, the lock system in 1160, or the like).

VoIP phone 1140 may make and receive VoIP calls over network 1110. VoIP phone 1140 may make a phone call to the wearer of hearing assistance device 1010 by locating hearing assistance device 1010 through the use of the VOIP location register 1130. Once the hearing assistance device is located, the packets for the VoIP session may be sent via the presence device registered as the current location of the hearing instrument in the location register.

VOIP location register 1130 and hearing assistance location register 1120 may receive messages from presence devices 1020-1050 which may identify the hearing instrument or a wearer and include a network address (e.g., an IP address) to send traffic destined to the hearing instrument. For example, the presence devices may send a Uniform Resource Identifier (URI) of the wearer and a network address where that URI is reachable. Incoming VOIP or other traffic addressed to that URI may be routed to the IP address listed for that URI in the location register.

Certificate authority 1125 may issue one or more certificates to hearing assistance devices 1010 and in some examples to presence devices 1020-1050 for authenticating the presence devices and the hearing assistance devices 1010 to each other.

Figure 2:
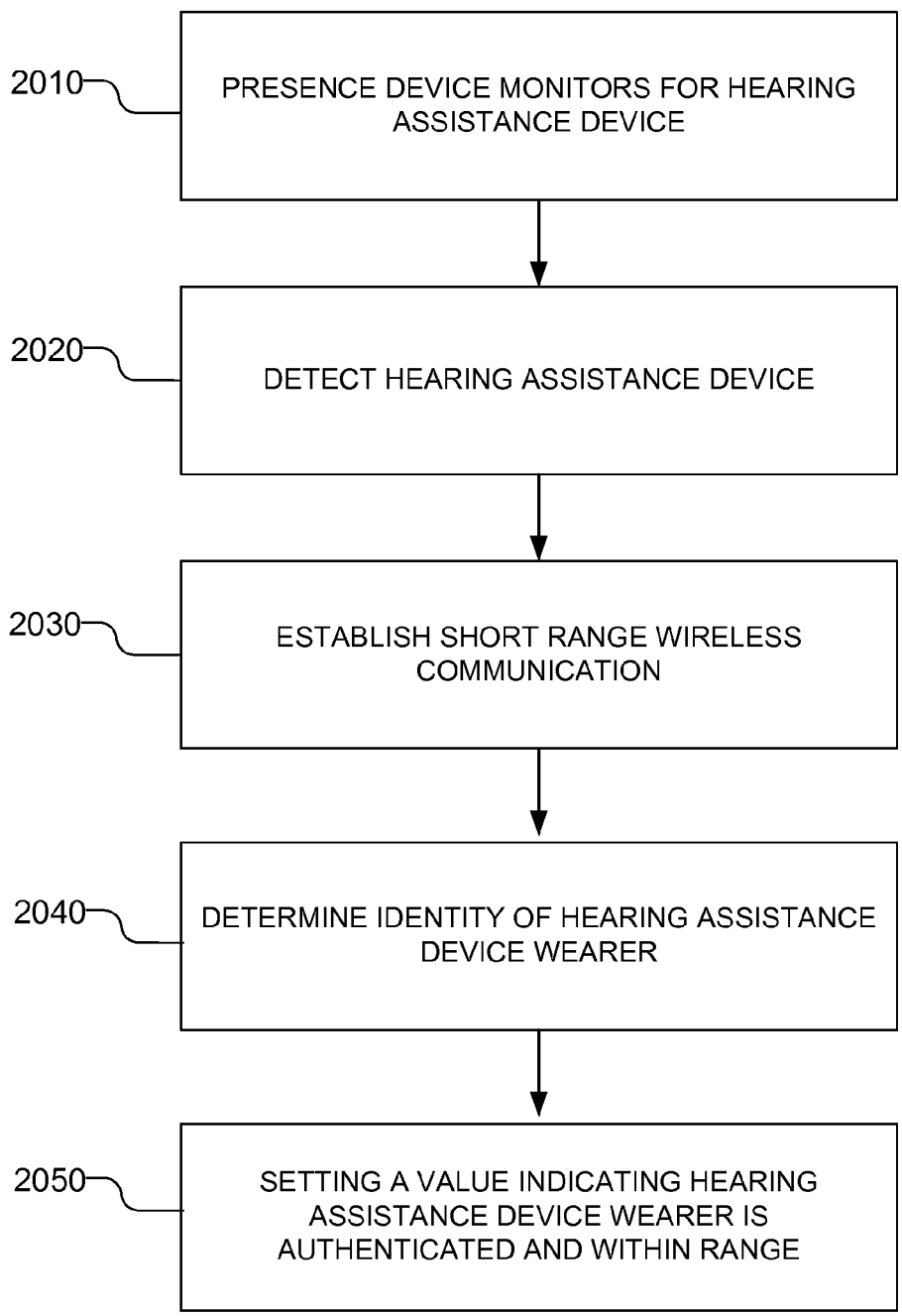
FIG. 2 shows a flowchart of a method of a presence device according to some examples of the present disclosure.

FIG. 2 shows an example method of a presence device. At operation 2010 the presence device may monitor for a hearing assistance device. For example, the presence device may send out a beacon or ping message. Hearing assistance devices that are within range and not already connected to the presence device may respond. For Bluetooth communications protocols this operation may correspond to the inquiry procedure where master devices may listen from inquiries broadcast by slave devices (either the presence device or the hearing instrument may take the role of master with the other taking the role of slave). Upon receiving an inquiry the slave device will send a reply. In other examples the presence device may listen for a ping, beacon, or inquiry from the hearing instrument.

At operation 2020 the hearing assistance device is detected by the presence device. For example, the hearing assistance device may respond to an inquiry from the presence device (or conversely, the presence device may respond to inquiries from the hearing assistance device). At operation 2030 the hearing assistance device may connect with the presence device. This may correspond to the paging procedure in Bluetooth, or some other connection procedure used by the short range wireless protocol to synchronize the wireless transmissions and other connection setup procedures.

At operation 2040, the identity of the wearer is established. In some examples the presence device may already be pre-programmed for a particular hearing assistance device. In these examples, simply making a connection with the hearing assistance device may enable the presence device to determine the hearing assistance device's identity. In these examples, the presence device may already have any identity information necessary (e.g., to report the hearing assistance device to the location registers) stored in a storage device accessible by the presence device (e.g., local storage). This information may be provided to the presence device during manufacture, setup, or at a later time through a user interface of the presence device. In other examples, the hearing assistance device may provide an identifier to allow the presence device to identify it. For example, the hearing assistance device may provide an identifier during the connection process at one of operations 2010-2030 or through an authentication process which may be part of operation 2040. At operation 2050, the presence device may set a value indicating that the hearing assistance device wearer is authenticated and within range of the presence device. For example, the presence device may have a table or other data structure which keeps track of current hearing instruments in wireless range of the presence device. In other examples, the presence device may notify one or more location based service providers that the wearer's hearing assistance device is within range. In still other examples, the presence device may update one or more location registers.

Figure 3:
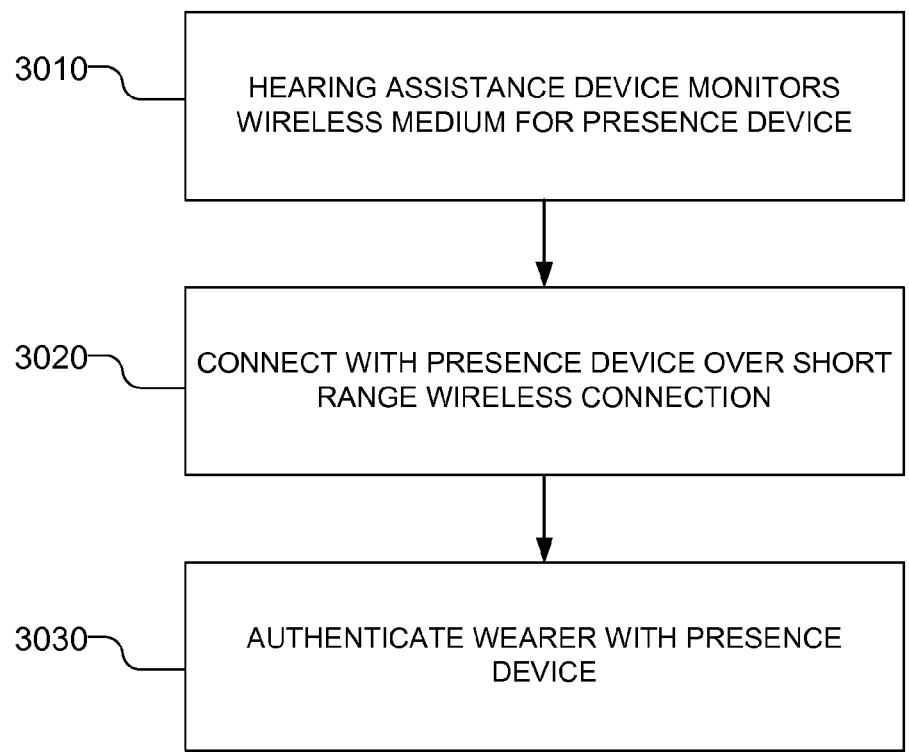
FIG. 3 shows a flowchart of a method of a hearing assistance device according to some examples of the present disclosure.

FIG. 3 shows an example method of a hearing instrument updating a presence device according to some examples of the present disclosure. At operation 3010 the hearing assistance device may monitor the wireless medium for a presence device. For example, the hearing instrument may broadcast a Bluetooth inquiry looking for presence devices. In other examples, the hearing instrument may be the master device and may listen for inquiries from presence devices.

At operation 3020 responsive to finding a presence device, the hearing instrument may connect with the presence device over a short range wireless connection. For example, responsive to a reply from a presence device (or a reply to the presence device) the hearing instrument may page or be paged by the presence device and start a Bluetooth connection.

At operation 3030 the wearer of the hearing instrument is authenticated with the presence device. In some examples the authentication of the wearer happens as a consequence of the connection between the hearing instrument and the presence device. In other examples, the authentication may include additional messaging.

Figure 4:
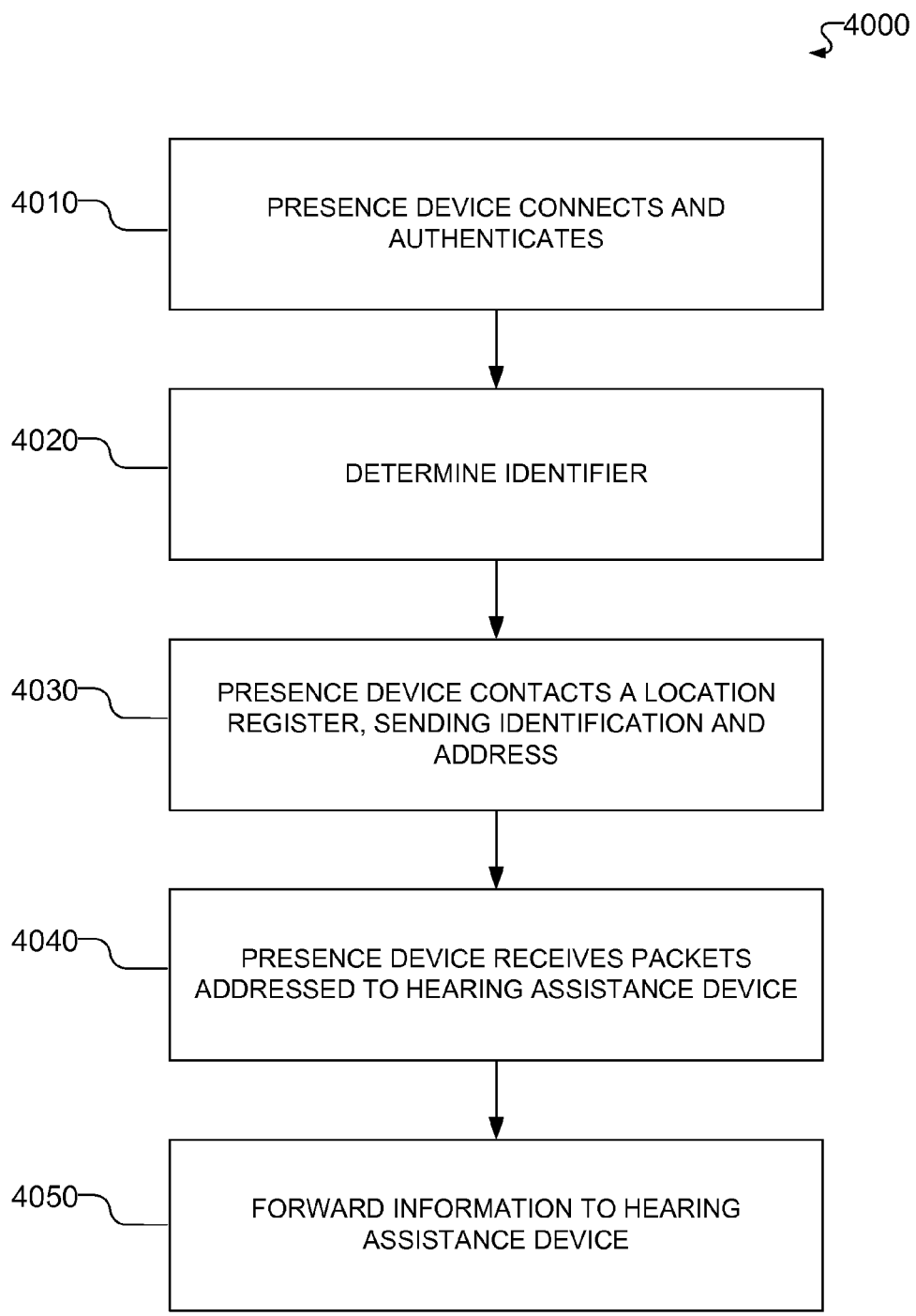
FIG. 4 shows a flowchart of a method of a presence device according to some examples of the present disclosure.

FIG. 4 shows an example method 4000 of updating a location register according to some examples. At operation 4010 the presence device connects with and in some examples authenticates with, a hearing instrument. At operation 4020 the presence device may determine an identifier for the hearing instrument or the hearing instrument wearer to report to the presence device. For example, a URI for the hearing instrument or the hearing instrument wearer. The identifier may be retrieved from a memory in the presence device (e.g., stored during connection setup, device pairing, or device setup), or received via additional messaging with the hearing instrument, or the like.

At operation 4030, the presence device may contact a location register to update the hearing instrument's location with the location register. The presence device may send the location register an identifier for the hearing instrument or the wearer to the location register along with the presence device's network address (e.g., IP address). In some examples, the presence device may contact multiple location registers or update multiple records in the location register. For example, the hearing instrument wearer may have multiple VoIP accounts. The addresses of the location registers and the identifications of the user or the hearing instrument as well as rules which specify when to contact the location registers may be stored at the presence device, sent from the hearing instrument, configured via a management server accessible to the presence device across a network, programmed into the device, or the like. At operation 4040 the presence device may receive one or more packets addressed to the hearing assistance device. At operation 4050 the packets may then be forwarded on to the hearing assistance device.

Figure 5:
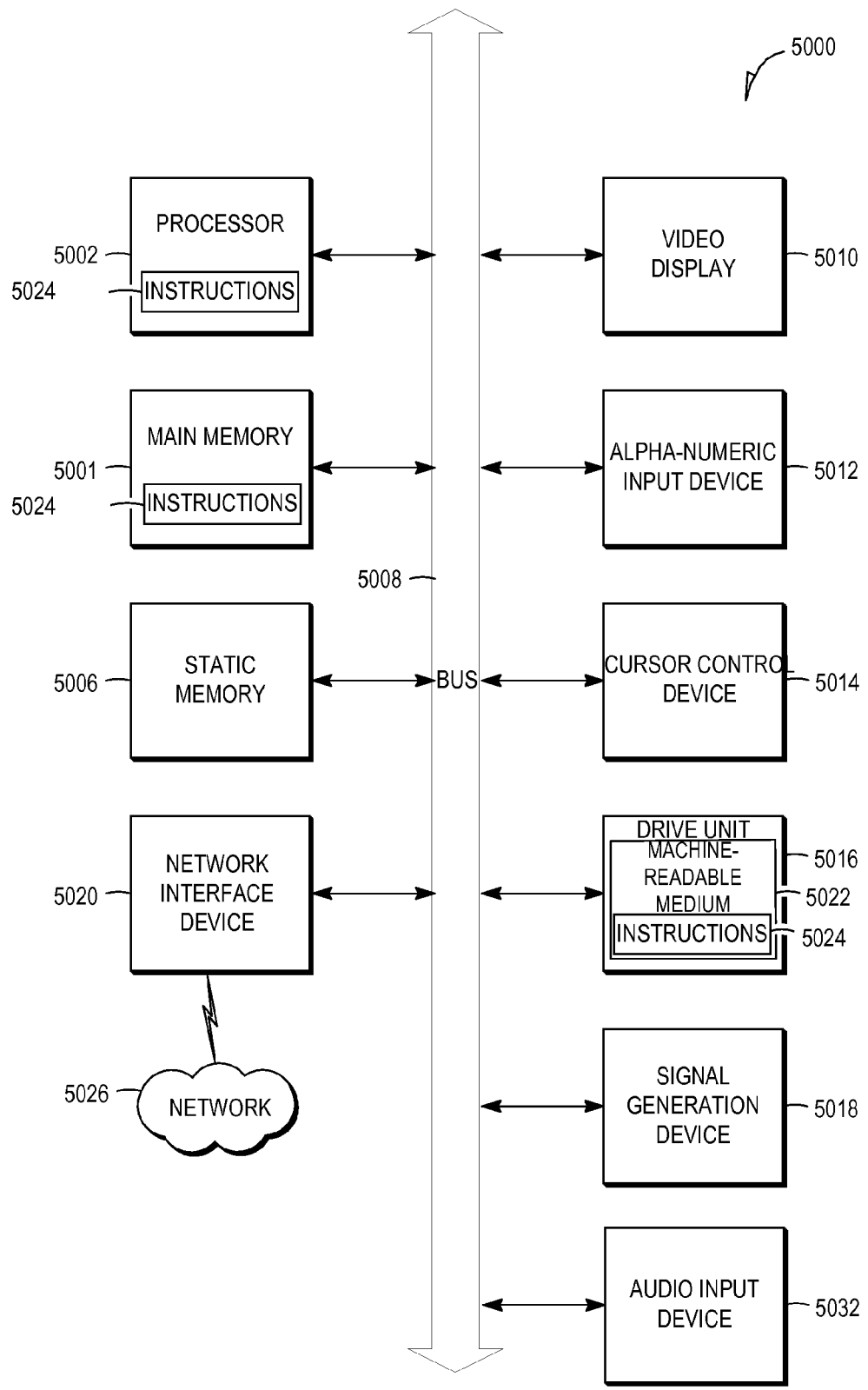
FIG. 5 shows a schematic of a machine according to some examples of the present disclosure.

FIG. 5 illustrates a block diagram of an example machine 5000 upon which any one or more of the techniques (e.g., methodologies) discussed herein can be performed. The presence device, a location services provider, a mobile device, a hearing instrument, or any machine herein described may be or include parts of, machine 5000. In alternative embodiments, the machine 5000 can operate as a standalone device or can be connected (e.g., networked) to other machines. In a networked deployment, the machine 5000 can operate in the capacity of a server machine, a client machine, or both in server-client network environments. In an example, the machine 5000 can act as a peer machine in peer-to-peer (P2P) (or other distributed) network environment. The machine 5000 can also be a personal computer (PC), a tablet PC, a set-top box (STB), a Personal Digital Assistant (PDA), a mobile telephone (such as a UE), a web appliance, a wireless base station, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 5000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Machine (e.g., computer system) 5000 can include a hardware processor 5002 (e.g., a central processing unit (CPU), a graphics processing unit (GPU), a hardware processor core, or any combination thereof), a main memory 5004 and a static memory 5006, some or all of which can communicate with each other via a bus 5008. The machine 5000 can further include a display unit 5010, an alphanumeric input device 5012 (e.g., a keyboard), a user interface (UI) control device 5014, and/or other input devices. In an example, the display unit 5010 and UI control device 5014 can be a touch screen display. The machine 5000 can additionally include a storage device (e.g., drive unit) 5016, a signal generation device 5018 (e.g., a speaker), and a network interface device 5020, an audio input device 5032 (e.g., a microphone) and the like.

The storage device 5016 can include a machine-readable medium 5022 on which is stored one or more sets of data structures or instructions 5024 (e.g., software) embodying or utilized by any one or more of the techniques or functions described herein. The instructions 5024 can also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 can constitute machine readable media.

While the machine-readable medium 5022 is illustrated as a single medium, the term "machine readable medium" can include a single medium or multiple media (e.g., a centralized or distributed database, and/or associated caches and servers) that configured to store the one or more instructions 5024.

The term "machine-readable medium" can include any tangible medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 5024 can further be transmitted or received over a communications network 5026 using a transmission medium via the network interface device 5020. Network interface device 5020 may connect the machine 5000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 5020 can include one or more physical jacks (e.g., Ethernet, coaxial, or phone jacks) or one or more antennas to connect to the communications network 5026. In an example, and as shown in FIG. 5, the network interface device 5020 can include a plurality of antennas (not shown) to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 5000, and includes digital or analog communications signals or other intangible medium to facilitate communication of such software.

As explained, the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. As already noted, the processor is adapted to perform instructions stored in memory which may or may not be explicitly shown. Various types of memory may be used, including volatile and non-volatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter. For example, the processor may receive audio input from a microphone, process the audio, and then output the processed audio from a speaker of the device. Processing can include increasing or decreasing amplification of one or more particular sound frequency ranges.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

OTHER EXAMPLES

Example 1

A method of providing location based services, the method comprising: at a presence device: monitoring for the presence of a hearing instrument; responsive to detecting the hearing instrument: establishing a short-range wireless communication session with the hearing instrument using a computer processor; determining an identity of the hearing instrument wearer; and responsive to determining the identity of the wearer, setting a value indicating that the hearing instrument wearer is authenticated with and within the wireless range of the presence device.

Example 2

The method of example 1, comprising sending a notification that the hearing instrument wearer is authenticated with and within the wireless range of the presence device to a computer system authentication process, the computer system authentication process unlocking a computer system responsive to the notification that the hearing instrument wearer is authenticated with and within the wireless range of the presence device.

Example 3

The method of any one of examples 1-2, comprising sending a notification that the hearing instrument wearer is authenticated with and within the wireless range of the presence device to a location register to register an address of the hearing instrument, the notification including an Internet Protocol (IP) address of the hearing instrument and a uniform resource identifier (URI) of the hearing instrument wearer.

Example 4

The method of any one of examples 1-3, comprising: receiving Session Initiation Protocol packets at the presence device, and forwarding Session Initiation Protocol (SIP) packets from the presence device to the hearing instrument.

Example 5

The method of any one of examples 1-4, comprising sending a notification that the hearing instrument wearer is authenticated with and within the wireless range of the presence device to an automated lock system, the automated lock system unlocking a lock controlled by the automated lock system responsive to the notification that the hearing instrument wearer is within the wireless range of the presence device.

Example 6

The method of example 5, wherein the automated lock includes a car ignition.

Example 7

The method of any one of examples 1-6, wherein the short range wireless communication session is a Bluetooth wireless session.

Example 8

The method of any one of examples 1-7, further comprising: detecting that the hearing instrument has moved beyond the wireless range of the presence device; and clearing the value.

Example 9

A system comprising: a presence device configured to: monitor for the presence of a hearing instrument; responsive to detecting the hearing instrument: establish a short-range wireless communication session with the hearing instrument using a computer processor; determine an identity of the hearing instrument wearer; and set a value indicating that the hearing instrument wearer is authenticated with and within the wireless range of the presence device responsive to determining the identity of the hearing instrument wearer.

Example 10

The system of example 9, comprising a computer system and wherein the presence device is configured to send a notification that the hearing instrument wearer is authenticated with and within the wireless range of the presence device to the computer system and wherein the computer system is configured to unlock responsive to the notification that the hearing instrument wearer is authenticated with and within the wireless range of the presence device.

Example 11

The system of any one of examples 9-10, wherein the presence device is configured to send a notification that the hearing instrument wearer is authenticated with and within the wireless range of the presence device to a location register to register the location of the hearing instrument, the notification including an IP address of the hearing instrument and a uniform resource identifier (URI) of the hearing instrument wearer.

Example 12

The system of any one of examples 9-11, comprising a location register, wherein the presence device is configured to send a notification that the hearing instrument wearer is authenticated with and is within the wireless range of the presence device, and wherein the location register is configured to forward SIP messages addressed to the hearing instrument wearer to the presence device responsive to receiving the notification.

Example 13

The system of any one of examples 9-12, comprising an automated lock system, and wherein the presence device is configured send a notification that the hearing instrument wearer is authenticated with and within the wireless range of the presence device to the automated lock system, wherein the automated lock system is configured to unlock a physical lock controlled by the automated lock system responsive to receiving the notification that the hearing instrument wearer is within the wireless range of the presence device.

Example 14

The system of example 13, wherein the automated lock includes a car ignition.

Example 15

The system of any one of examples 9-14, wherein the short range wireless communication session is a Bluetooth wireless session.

Example 16

A hearing instrument comprising: a microphone; a digital signal processor configured to: process sounds captured by the microphone and play the processed sounds through a speaker; monitor a wireless medium to detect a presence device; connect with the presence device using a short range wireless connection on the wireless medium; and authenticate the wearer of the hearing instrument with the presence device.

Example 17

The hearing instrument of example 16, wherein the hearing instrument communicates with the presence device using one of a: Shockburst wireless protocol, an Enhanced Shockburst wireless protocol, a Wireless Fidelity (WiFi) protocol utilizing an Institute for Electrical and Electronics Engineers (IEEE) 802.11 family of standards, and a Bluetooth wireless protocol.

Example 18

The hearing instrument of any one of examples 16-17, wherein authenticating the wearer of the hearing instrument comprises utilizing a Bluetooth proximity profile.

Example 19

The hearing instrument of any one of examples 16-18, wherein authenticating the wearer comprises sending an encrypted key to the presence device.

Example 20

The hearing instrument of any one of examples 16-19, wherein the digital signal processor is further configured to: receive incoming Voice over IP (VOIP) packets from the presence device; reconstruct an audio signal from the incoming VOIP packets; play the reconstructed audio signal from the incoming VOIP packets through the speaker; convert sounds captured by the microphone to outgoing VOIP packets; and transmit the outgoing VOIP packets to the presence device;

Example 21

The hearing instrument of any one of examples 16-20, wherein authenticating the wearer comprises sending information about the wearer of the device to the presence device.

Example 22

A method comprising: on a hearing instrument, monitoring a wireless medium to detect a presence device, connecting with the presence device using a short range wireless connection on the wireless medium, and authenticating the wearer of the hearing instrument with the presence device.

Example 23

The method of example 22, wherein the hearing instrument communicates with the presence device using one of a: Shockburst wireless protocol, an Enhanced Shockburst wireless protocol, a Wireless Fidelity (WiFi) protocol utilizing an Institute for Electrical and Electronics Engineers (IEEE) 802.11 family of standards, and a Bluetooth wireless protocol.

Example 24

The method of any one of examples 22-23, wherein authenticating the wearer of the hearing instrument comprises utilizing a Bluetooth proximity profile.

Example 25

The method of any one of examples 22-24, wherein authenticating the wearer comprises sending an encrypted key to the presence device.

Example 26

The method of any one of examples 22-25, further comprising receive incoming VOIP packets from the presence device; reconstruct an audio signal from the incoming VOIP packets; play the reconstructed audio signal from the incoming VOIP packets on a speaker; convert sounds captured by a microphone to outgoing VOIP packets; and transmit the outgoing VOIP packets to the presence device;

Example 27

The method of any one of examples 22-26, wherein authenticating the wearer comprises sending information about the wearer of the device to the presence device.

What is claimed is:

1. A method of providing location based services, the method comprising:
    at a presence device, using one or more processors:
    monitoring for the presence of a hearing instrument by listening for a wireless message from the hearing instrument; and
    responsive to detecting the wireless message from the hearing instrument:
        establishing a short-range wireless communication session with the hearing instrument;
        determining an identity of the hearing instrument;
        identifying a user of the hearing instrument based upon the determined identity of the hearing instrument;
        providing a location-based authentication service for at least a portion of a time that the hearing instrument maintains the short-range wireless communication session with the presence device, by sending a notification to register the hearing instrument at a location register, the notification including an identifier associated with the user of the hearing instrument and at least one of: a network address of the hearing instrument or a network address of the presence device.

2. The method of claim 1, wherein providing the location-based authentication service comprises: unlocking a computer system.

3. The method of claim 1, comprising: receiving Session Initiation Protocol packets at the presence device, and forwarding Session Initiation Protocol (SIP) packets from the presence device to the hearing instrument.

4. The method of claim 1, wherein providing the location-based authentication service comprises: unlocking a lock controlled by an automated lock system.

5. The method of claim 4, wherein the automated lock includes a car ignition.

6. The method of claim 1, wherein the short range wireless communication session is a Bluetooth wireless session.

7. The method of claim 1, further comprising:
    detecting that the hearing instrument has moved beyond the wireless range of the presence device; and
    resetting an authentication status of the user to an unauthenticated state.

8. A system comprising:
    a presence device including one or more computer processors, the computer processors configured to:
    monitor for the presence of a hearing instrument by listening for a wireless message from the hearing instrument; and
    responsive to detecting the wireless message from the hearing instrument:
        establish a short-range wireless communication session with the hearing instrument;
        determine an identity of the hearing instrument;
        identifying a user of the hearing instrument based upon the determined identity of the hearing instrument;
        providing a location-based authentication service for at least a portion of a time that the hearing instrument maintains the short-range wireless communication session with the presence device, by at least being configured to send a notification to register the hearing instrument at a location register, the notification including an identifier associated with the user of the hearing instrument and at least one of: a network address of the hearing instrument or a network address of the presence device.

9. The system of claim 8, comprising a computer system and wherein the computer processors are configured to provide a location based authentication service by at least being configured to unlock a computer system.

10. The system of claim 8, comprising the location register.

11. The system of claim 8, comprising an automated lock system, and wherein the computer processors are configured to provide a location based authentication service by at least being configured to unlock a physical lock controlled by the automated lock system.

12. The system of claim 11, wherein the automated lock includes a car ignition.

13. The system of claim 8, wherein the short range wireless communication session is a Bluetooth wireless session.

14. A hearing instrument comprising:
    a microphone; and
    a digital signal processor configured to:
        process sounds captured by the microphone and play the processed sounds through a speaker;
        monitor a wireless medium to detect a presence device;
        connect with the presence device using a short-range wireless connection on the wireless medium;
        identify a wearer of the hearing instrument to the presence device by at least sending information about the wearer of the device to the presence device;
        receive incoming Voice over IP (VOIP) packets from the presence device;
        reconstruct an audio signal from the incoming VOIP packets;
        play the reconstructed audio signal from the incoming VOIP packets through the speaker;
        convert sounds captured by the microphone to outgoing VOIP packets; and
        transmit the outgoing VOIP packets to the presence device.

15. The hearing instrument of claim 14, wherein the hearing instrument communicates with the presence device using a short range wireless connection using one of a: Shockburst wireless protocol, an Enhanced Shockburst wireless protocol, a Wireless Fidelity (WiFi) protocol utilizing an Institute for Electrical and Electronics Engineers (IEEE) 802.11 family of standards, and a Bluetooth wireless protocol.

16. The hearing instrument of claim 15, wherein identifying the wearer of the hearing instrument comprises utilizing a Bluetooth proximity profile.

17. The hearing instrument of claim 14, wherein identifying the wearer comprises sending an encrypted key to the presence device.

18. A method comprising:
    on a hearing instrument, monitoring a wireless medium to detect a presence device; connecting with the presence device using a short-range wireless connection on the wireless medium; identifying a wearer of the hearing instrument with the presence device, wherein identifying the wearer comprises sending information about the wearer of the hearing instrument to the presence device;

receiving incoming VOIP packets from the presence device;

reconstructing an audio signal from the incoming VOIP packets;

playing the reconstructed audio signal from the incoming VOIP packets on a speaker;

converting sounds captured by a microphone to outgoing VOIP packets; and transmitting the outgoing VOIP packets to the presence device.

19. The method of claim 18, wherein the hearing instrument communicates with the presence device using one of a: Shockburst wireless protocol, an Enhanced Shockburst wireless protocol, a Wireless Fidelity (WiFi) protocol utilizing an Institute for Electrical and Electronics Engineers (IEEE) 802.11 family of standards, and a Bluetooth wireless protocol.

20. The method of claim 19, wherein identifying the wearer of the hearing instrument comprises utilizing a Bluetooth proximity profile.

21. The method of claim 18, wherein identifying the wearer comprises sending an encrypted key to the presence device.

22. The method of claim 1, wherein the short-range wireless communication session is a communication session over a short-range wireless protocol, the short-range wireless protocol being a wireless protocol with a range of 100 meters or less.

23. The system of claim 8, wherein the short-range wireless communication session is a communication session over a short-range wireless protocol, the short-range wireless protocol being a wireless protocol with a range of 100 meters or less.

24. The hearing instrument of claim 14, wherein the short-range wireless connection is a communication session over a short-range wireless protocol, the short-range wireless protocol being a wireless protocol with a range of 100 meters or less.

25. The method of claim 18, wherein the short-range wireless connection is a communication session over a short-range wireless protocol, the short-range wireless protocol being a wireless protocol with a range of 100 meters or less.

* * * * *